United States Patent
Kung et al.

(10) Patent No.: US 10,623,557 B2
(45) Date of Patent: Apr. 14, 2020

(54) COGNITIVE TELEPHONE FRAUD DETECTION

(71) Applicant: International Business Machines Corporation, Armonk, NY (US)

(72) Inventors: Norman Kung, Taipei (TW);
Tao-Hung Jung, Taipei (TW);
Ching-Chun Liu, Taipei (TW);
Yu-siang Chen, Taipei (TW); Ci-Wei Lan, Keelung (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/993,447

(22) Filed: May 30, 2018

(65) Prior Publication Data
US 2019/0373105 A1 Dec. 5, 2019

(51) Int. Cl.
*H04M 3/22* (2006.01)
*H04M 3/42* (2006.01)
(Continued)

(52) U.S. Cl.
CPC ....... *H04M 3/2281* (2013.01); *G10L 15/1815* (2013.01); *G10L 15/1822* (2013.01);
(Continued)

(58) Field of Classification Search
CPC ........... H04M 3/2281; H04M 3/42221; H04M 3/42059; H04M 2201/40;
(Continued)

(56) References Cited

U.S. PATENT DOCUMENTS

| | | | |
|---|---|---|---|
| 7,035,802 B1* | 4/2006 | Rigazio | G06F 16/322 |
| | | | 704/256 |
| 7,346,509 B2* | 3/2008 | Gallino | G10L 15/063 |
| | | | 704/240 |

(Continued)

FOREIGN PATENT DOCUMENTS

WO    WO 2017/066648    4/2017

OTHER PUBLICATIONS

Vijay Gaur, "Real Time Call Fraud Detection With Machine Learning," https://www.linkedin.com/pulse/real-time-call-fraud-detection-machine-learning-vijay-gaur, Jun. 21, 2017.

*Primary Examiner* — Andrew C Flanders
(74) *Attorney, Agent, or Firm* — Steven M. Greenberg, Esq.; Shutts & Bowen LLP

(57) ABSTRACT

Embodiments of the present invention provide a method, system and computer program product for telephonic fraud prevention. In an embodiment of the invention, a method of telephonic fraud prevention includes speech recognizing in real-time, audio of a telephone call from a caller to a called party. Once the real-time audio has been speech recognized into text, the text may be parsed into words and the words compared to a hierarchical semantic tree of terms. On the condition that a match is detected between one of the words and a node of the tree, a level of the tree is identified at which the match is detected and the level is correlated to a degree of risk of the telephone call. Finally, an alert is displayed to the called party reflecting the degree of risk.

18 Claims, 2 Drawing Sheets

(51) Int. Cl.
*G10L 15/22* (2006.01)
*G10L 15/18* (2013.01)

(52) U.S. Cl.
CPC ......... *G10L 15/22* (2013.01); *H04M 3/42059* (2013.01); *H04M 3/42221* (2013.01); *H04M 2201/40* (2013.01); *H04M 2203/6027* (2013.01)

(58) Field of Classification Search
CPC ......... H04M 2203/6027; H04M 15/47; H04M 2215/0148; G10L 15/1822; G10L 15/1815; G10L 15/22; H04W 12/12
See application file for complete search history.

(56) References Cited

U.S. PATENT DOCUMENTS

| | | | |
|---|---|---|---|
| 9,472,194 B2 | 10/2016 | Jones | |
| 9,607,023 B1* | 3/2017 | Swamy | G06F 16/217 |
| 9,729,727 B1 | 8/2017 | Zhang | |
| 2010/0228656 A1* | 9/2010 | Wasserblat | G06Q 10/10 705/35 |
| 2010/0303211 A1 | 12/2010 | Hartigg et al. | |
| 2010/0317420 A1* | 12/2010 | Hoffberg | G06Q 30/0207 463/1 |
| 2013/0304453 A9* | 11/2013 | Fritsch | G06F 17/2785 704/9 |
| 2014/0244317 A1* | 8/2014 | Roberts | G06Q 40/08 705/4 |
| 2014/0270108 A1* | 9/2014 | Riahi | H04M 3/4936 379/88.01 |
| 2014/0297268 A1* | 10/2014 | Govrin | G06Q 40/02 704/9 |
| 2015/0170051 A1* | 6/2015 | Bufe, III | G06N 3/126 706/13 |
| 2015/0195406 A1* | 7/2015 | Dwyer | H04M 3/5175 379/265.07 |
| 2015/0286945 A1* | 10/2015 | Brewster | G06N 5/04 706/12 |
| 2016/0150414 A1 | 5/2016 | Flaks et al. | |
| 2016/0283923 A1* | 9/2016 | Hertel | G06Q 20/02 |
| 2017/0019529 A1* | 1/2017 | Bostick | H04M 3/2281 |

\* cited by examiner

COGNITIVE TELEPHONE FRAUD DETECTION

BACKGROUND OF THE INVENTION

Field of the Invention

The present invention relates to the field of fraud prevention and more particularly to the prevention of fraud by way of a telephone call.

Description of the Related Art

Fraud has been part and parcel of society since the dawn of man. Indeed, the earliest biblical accounts of society involve the fraudulent behavior of man and animal alike (and particularly one very deceitful snake in a garden). Fraud presents itself according to many different modalities. Historically, fraud involved a face-to-face, interpersonal in which the fraudster through a combination trust and deceit separated money or other objects of value from the victim. However, with the advancement of technology, fraud no longer required a face-to-face interaction. Instead, technological advancements now permit the fraudster to commit deceitful acts remotely without exposing the clues of physical movements and expressions for the interpretation by the victim. Indeed, these clues provide a limited opportunity for the victim to detect a fraud in process. As such, it is of strategic advantage for a fraudster to utilize remote communicative techniques in order to perpetuate a fraud.

Telephonically, the prototypical fraudster initiates contact through a telephone call to the prospective victim and presents him or herself as a matter of deceit as an individual seeking some sort of financial arrangement. In some circumstances, the financial arrangement is an investment opportunity. In other circumstances, the financial arrangement is a request to satisfy an obligation such as a debt or government obligation. In yet other circumstances, the financial arrangement is a request to transfer funds or objects of value to trusted, known individuals. But, in all circumstances, the fraudster remains visibly obscured by virtue of the use of a telephone to conduct the fraud. Rather, during an attempt to conduct a fraud by telephone, the fraudster only exposes his or her voice to the prospective victim.

BRIEF SUMMARY OF THE INVENTION

Embodiments of the present invention address deficiencies of the art in respect to telephonic fraud and provide a novel and non-obvious method, system and computer program product for telephonic fraud prevention. In an embodiment of the invention, a method of telephonic fraud prevention includes speech recognizing in real-time, audio of a telephone call from a caller to a called party. Once the real-time audio has been speech recognized into text, the text may be parsed into words and the words compared to a hierarchical semantic tree of terms. On the condition that a match is detected between one of the words and a node of the tree, a level of the tree is identified at which the match is detected and the level is correlated to a degree of risk of the telephone call. Finally, an alert is displayed to the called party reflecting the degree of risk.

In one aspect of the embodiment, the speech recognized audio may be submitted to a sentiment analysis engine to receive an indication of sentiment corresponding to the telephone call. Then, the indication of sentiment is compared to a pre-determined common sentiment for a classification of the telephone call so as to permit the displaying only on upon the indication of sentiment differing from the common sentiment. In another aspect of the embodiment, the speech recognized audio may be submitted to a sentiment analysis engine to receive an indication of sentiment corresponding to the telephone call and the indication of sentiment may be compared to a pre-determined common sentiment for a classification of the telephone call so as to additionally display a confirmation of the alert upon the indication of sentiment differing from the common sentiment.

In yet another aspect of the embodiment, a source phone number for the call may be detected and a geographic location identified from which the telephone call originates. Then, it may be determined if the geographic location is associated with a higher risk of a fraudulent telephone call. As such, the speech recognizing, parsing, identifying and displaying may be performed only in response to determining that the geographic location is associated with a higher risk of a fraudulent telephone call.

Finally, in even yet another aspect of the embodiment, a set of telephone calls received by the called party may be recorded with the consent of the permission of the called party and classified based upon keywords detected in speech recognized text of each of the phone calls. Then, each of the calls are submitted to a sentiment analysis engine in order to compute a set of sentiments for the classifications recording a set of telephone calls received by the called party. When the recorded audio is no longer needed, the recorded audio is deleted. In this way, a common sentiment for each classification may be maintained for comparison to a sentiment determined for the receipt of a telephone call in real time of a common classification so as to detect a disparity in sentiment indicative of a fraudulent phone call. Accordingly, as part of the alert, the risk value assigned to the disparity of sentiment may be displayed.

In another embodiment of the invention, a data processing system is configured for telephonic fraud prevention. The system includes a host computing system that has memory and at least one processor and that is coupled to a telephone. The system also includes fixed storage coupled to the host computing system and a hierarchical semantic tree of terms stored in the fixed storage. Finally, the system includes a telephonic fraud prevention module. The module includes computer program instructions executing in the memory of the host computing system that upon execution are adapted to perform: speech recognizing in real-time, audio of a telephone call processed in the telephone from a caller to a called party; parsing text from the speech recognized audio and comparing words of the text to the hierarchical semantic tree of terms stored in the fixed storage; and, on condition that a match is detected between one of the words and a node of the tree, identifying a level of the tree and correlating the level to a degree of risk of the telephone call, and displaying an alert in the telephone to the called party reflecting the degree of risk.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for telephonic fraud prevention. In accordance with an embodiment of the invention, different telephone conversations between different callers and a selected called party are recorded. Each recorded telephone conversation is classified by subject type of telephone call and subjected to sentiment analysis in order to compute a sentiment for each common classification of telephone call. Thereafter, upon receiving a telephone call from a caller to the called party, audio of the telephone call is recorded and a sentiment analysis performed. Further, the audio is speech recognized into text and the text parsed to identify different words of the text. The different words are used both to classify the type of the telephone call and also to submit the different words to a semantic tree. Upon matching a word in the tree, a degree of risk is determined based upon a level in the tree at which the word is matched. A sentiment determined during the sentiment analysis is then compared to a sentiment typical for the classification of the telephone call. On the condition that a disparity exists between the typical sentiment and the determined sentiment, an alert is presented to the called party indicating the determined degree of risk. In this way, the called party may be cognitively alerted to a deceitful attempt to commit fraud upon the called party despite the inability of the called party to visually see the caller.

Figure 1:
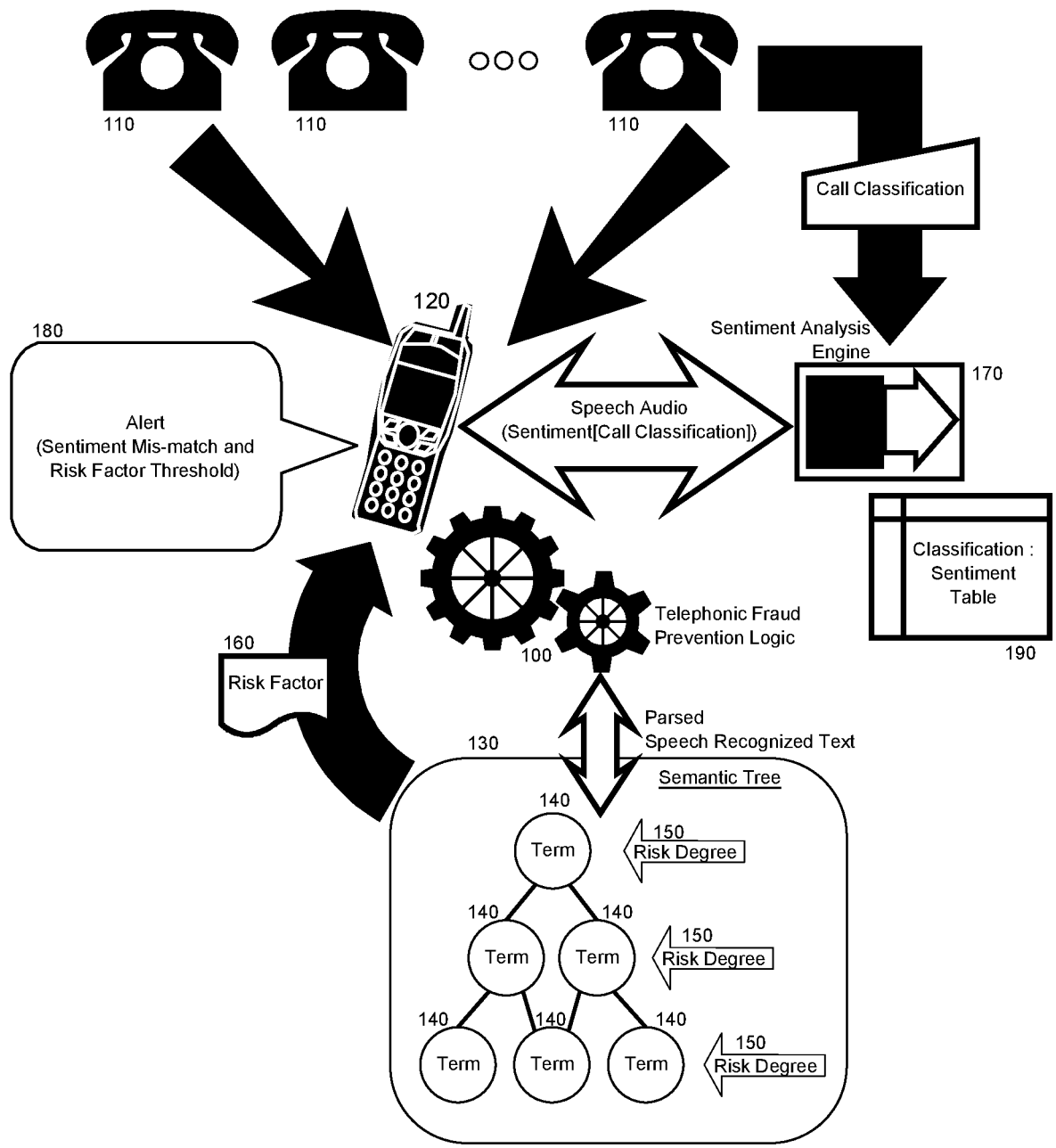
FIG. 1 is pictorial illustration of a process for telephonic fraud prevention.

In further illustration, FIG. 1 pictorially shows a process for telephonic fraud prevention. As shown in FIG. 1, different telephone calls from different telephones 110 are placed to recipient telephone 120. Each of the calls is classified and provided to a sentiment analysis engine 170 which determines a sentiment of each telephone call and organizes a table of sentiments to call classifications 190. Thereafter, when a telephone call is received in the recipient telephone 120, telephonic fraud prevention logic 100 classifies a type of the telephone call, provides speech audio from the telephone call to the sentiment analysis engine 170 so as to determine a sentiment of the telephone call and submits speech recognized terms of the speech audio to a semantic tree 130 of different nodes 140 so as to identify a furthest depth of the tree 130 at which a term of a node 140 matches a term of the speech recognized terms.

To the extent that the telephonic fraud prevention logic 100 detects a disparity between the determined sentiment and a sentiment stored in the table 190 for the classification of the type of the telephone call, telephonic fraud prevention logic 100 retrieves a risk degree 150 associated with the furthest depth of the tree 130 at which a term of a node 140 matches a term of the speech recognized terms. The, the telephonic fraud prevention logic 100 computes a risk factor 160 based upon the risk degree 150. Finally, if the risk factor 160 exceeds a pre-determined threshold of risk, the telephonic fraud prevention logic 100 displays an alert 180 in the recipient telephone 120 as to the detection of an attempted telephonic fraud.

Figure 2:
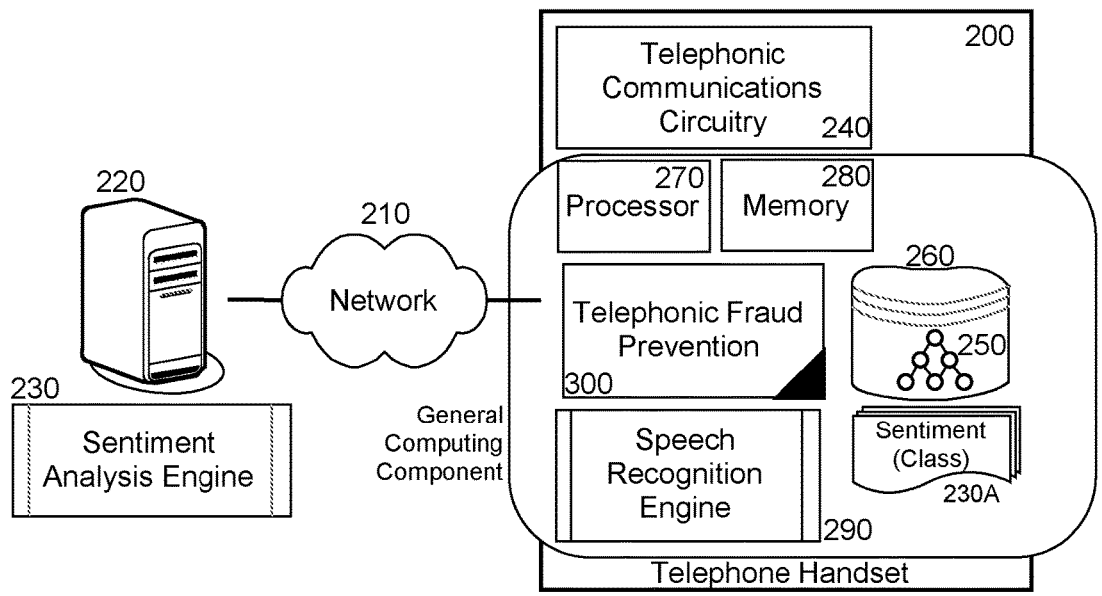
FIG. 2 is a schematic illustration of a data processing system adapted for telephonic fraud prevention; and, FIG. 3 is a flow chart illustrating a process for telephonic fraud prevention.

The process shown in FIG. 1 may be implemented in a computer data processing system. In further illustration, FIG. 2 schematically shows a data processing system adapted for telephonic fraud prevention. The system includes a telephone handset 200 that includes telephonic communications circuitry 240 facilitating and managing the origination, receipt and management of telephone calls, and a general computing component including a central processing unit 270 and memory 280. Fixed storage 260 is disposed in the general computing component of the telephone handset 200 and stores therein a table of sentiments 230A for different classifications of telephone calls, and also a semantic tree 250 of different nodes, each node corresponding to a different term and different levels corresponding to different risk factors for a fraudulent telephone call.

Telephonic fraud prevention module 300 includes program instructions which execute in the memory 280 of the general computing component of the telephone handset 200. The program instructions are enabled to submit speech audio of a telephone call accessed in the telephonic communications circuitry 240 to a sentiment analysis engine 230 operating in a server 220 over computer communications network 210 in order to receive a computed sentiment of the telephone call. The program instructions also are enabled to direct speech recognition engine 290 to speech recognize the speech audio of the telephone call and to submit text of the of the speech recognized audio to the semantic tree 250 in order to identify a deepest depth of the semantic tree 250 at which one or more words in the text may be found and to retrieve a corresponding risk factor.

Finally, the program instructions are enabled to classify the telephone call using the text, for instance by performing a look up of terms in the text to pre-specified call classifications. Having classified the telephone call, the program instructions are enabled to determine if a mis-match or disparity exists between a sentiment for the classification of the telephone call stored in the table of sentiments 230A and a sentiment produced by the sentiment analysis engine 230. To the extent that a mis-match is detected, the program instructions of the telephonic fraud prevention module 300 determines if the corresponding risk factor exceeds a pre-determined threshold and if so, the program instructions are enabled to display an alert in a display of the telephone handset 200 indicating a potential telephonic fraud.

Figure 3:
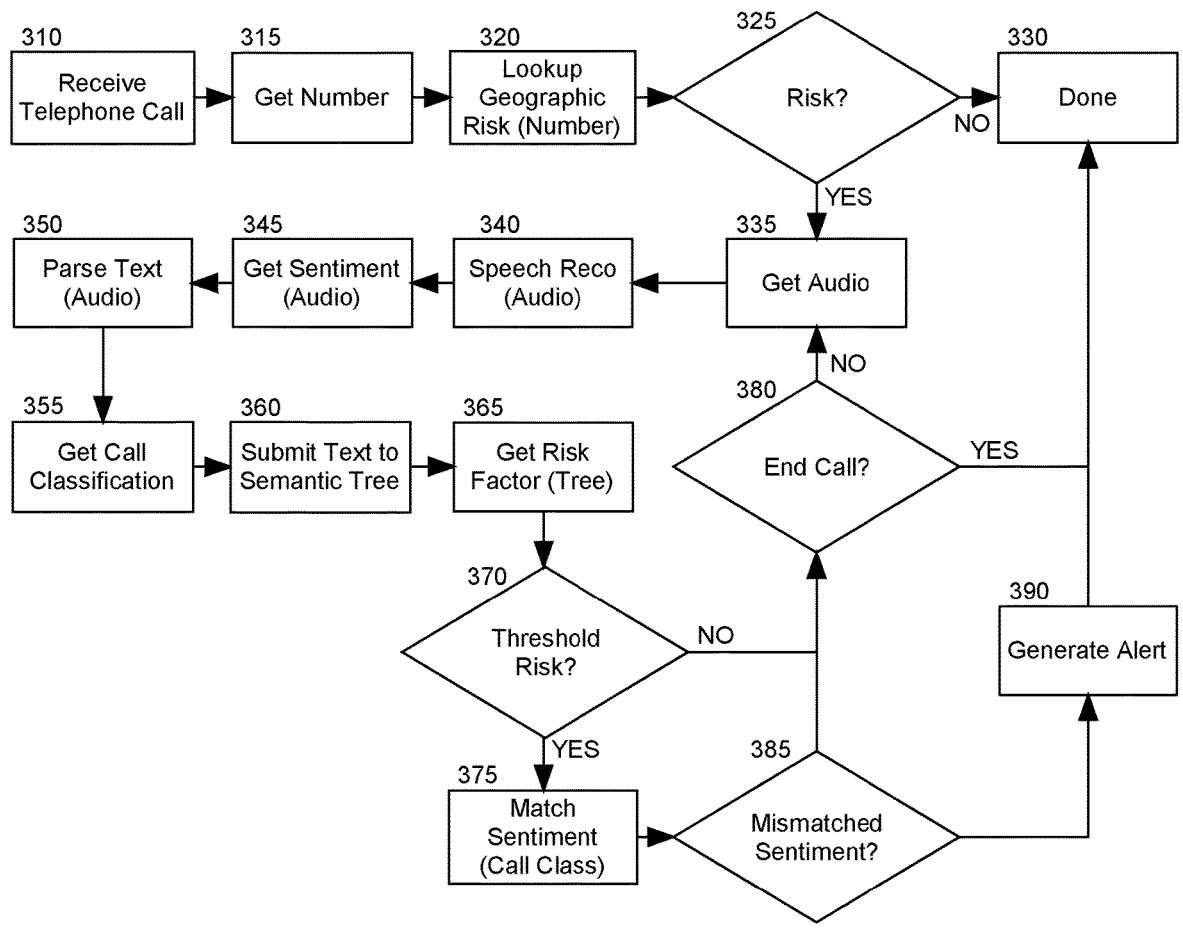

In even yet further illustration of the operation of the telephonic fraud prevention module 300, FIG. 3 is a flow chart illustrating an exemplary process for telephonic fraud prevention. Beginning in block 310, a telephone call is received in a telephone. In block 315, an originating telephone number is determined for the telephone call, for example by inspecting the automatic number identification (ANI) information included as part of the signaling of the telephone call. In block 320, a geographic risk value is retrieved from memory of the telephone based upon the telephone number. In decision block 325, it is determined of the geographic risk value exceeds a pre-stored threshold. If not, the process ends in block 330. Otherwise, the process continues in block 335.

In block 335, speech audio is received from the telephone call and speech recognized in block 340 so as to produce computer processible text reflective of a portion of a transcript of the telephone call. In block 345, the speech audio also is provided to a sentiment analysis engine from which an indication of sentiment is received in the telephone in return. In block 350, the text of the speech audio is parsed and in block 355, different parsed words of the text are used as a lookup to a table in order to determine a classification of a type of the telephone call, for example, a personal telephone call, a sales telephone call, an informational telephone call, charitable solicitation telephone call, a government telephone call, and the like.

In block 360, the parsed words are also submitted to a semantic tree for matching. In block 365, a risk factor is retrieved from the semantic tree based upon a depth of the tree at which one or more nodes correspond to words also present amongst the parsed words. Subsequently, in decision block 370, it is determined if the risk factor exceeds a pre-determined threshold value. If not, in decision block 380 it is determined if the telephone call has ended. If not, additional speech audio for the telephone call is received in block 335 and the process repeats through 340. But, otherwise, the process ends in block 330.

In decision block 370, however, if it is determined that the risk factor exceeds the pre-determined threshold value, in block 375, the indication of sentiment is compared to a sentiment for the determined classification of the type of the telephone call. In decision block 385, it is determined if a sentiment mis-match exists. If so, in block 390, an alert is generated in the telephone, such as an audible alert or a visual display of an alert suggesting the potential for a fraudulent telephone call. Thereafter, the process ends in block 330.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method for telephonic fraud prevention comprising:
speech recognizing in real-time, audio of a telephone call from a caller to a called party;
parsing text from the speech recognized audio and comparing words of the text to a hierarchical semantic tree of terms;
establishing different risk degrees for each level of a multiplicity of nodes of the hierarchical semantic tree of terms; and,
on condition that a match is detected between one of the words and a word of a node of the tree, identifying a furthest depth of the tree at which the one of the words and the term of the node match, identifying a level for the furthest depth of the tree, correlating the identified level to a degree of risk of the telephone call, and displaying an alert to the called party reflecting the degree of risk.

2. The method of claim 1, further comprising:
submitting the speech recognized audio to a sentiment analysis engine to receive an indication of sentiment corresponding to the telephone call;
comparing the indication of sentiment to a pre-determined common sentiment for a classification of the telephone call; and,
performing the displaying only on upon the indication of sentiment differing from the common sentiment.

3. The method of claim 1, further comprising:
submitting the speech recognized audio to a sentiment analysis engine to receive an indication of sentiment corresponding to the telephone call;
comparing the indication of sentiment to a pre-determined common sentiment for a classification of the telephone call; and,
additionally displaying a confirmation of the alert upon the indication of sentiment differing from the common sentiment.

4. The method of claim 1, further comprising:
detecting a source phone number for the call and identifying a geographic location from which the telephone call originates;
determining if the geographic location is associated with a higher risk of a fraudulent telephone call; and,
performing the speech recognizing, parsing, identifying and displaying in response to determining that the geographic location is associated with a higher risk of a fraudulent telephone call.

5. The method of claim 2, further comprising:
recording a set of telephone calls received by the called party;
classifying each telephone call in the set; and,
submitting each of the telephone calls in the set to a sentiment analysis engine in order to compute a sentiment common to each classification of the set.

6. The method of claim 3, further comprising:
recording a set of telephone calls received by the called party;
classifying each telephone call in the set; and,
submitting each of the telephone calls in the set to a sentiment analysis engine in order to compute a sentiment common to each classification of the set.

7. A data processing system configured for telephonic fraud prevention, the system comprising:
a host computing system comprising memory and at least one processor and coupled to a telephone;
fixed storage coupled to the host computing system;
a hierarchical semantic tree of terms stored in the fixed storage; and,
a telephonic fraud prevention module comprising computer program instructions executing in the memory of the host computing system that upon execution are adapted to perform:
speech recognizing in real-time, audio of a telephone call processed in the telephone from a caller to a called party;
parsing text from the speech recognized audio and comparing words of the text to the hierarchical semantic tree of terms stored in the fixed storage;
establishing different risk degrees for each level of a multiplicity of nodes of the hierarchical semantic tree of terms; and,
on condition that a match is detected between one of the words and a word of a node of the tree, identifying a furthest depth of the tree at which the one of the words and the term of the node match, identifying a level for the furthest depth of the tree, correlating the identified level to a degree of risk of the telephone call, and displaying an alert to the called party reflecting the degree of risk.

8. The system of claim 7, wherein the program instructions during execution are further adapted to perform:
submitting the speech recognized audio to a sentiment analysis engine to receive an indication of sentiment corresponding to the telephone call;
comparing the indication of sentiment to a pre-determined common sentiment for a classification of the telephone call; and,
performing the displaying only on upon the indication of sentiment differing from the common sentiment.

9. The system of claim 7, wherein the program instructions during execution are further adapted to perform:
submitting the speech recognized audio to a sentiment analysis engine to receive an indication of sentiment corresponding to the telephone call;

comparing the indication of sentiment to a pre-determined common sentiment for a classification of the telephone call; and, additionally displaying a confirmation of the alert upon the indication of sentiment differing from the common sentiment.

10. The system of claim 7, wherein the program instructions during execution are further adapted to perform:

detecting a source phone number for the call and identifying a geographic location from which the telephone call originates;

determining if the geographic location is associated with a higher risk of a fraudulent telephone call; and, performing the speech recognizing, parsing, identifying and displaying in response to determining that the geographic location is associated with a higher risk of a fraudulent telephone call.

11. The system of claim 8, wherein the program instructions during execution are further adapted to perform:

recording a set of telephone calls received by the called party;

classifying each telephone call in the set; and, submitting each of the telephone calls in the set to a sentiment analysis engine in order to compute a sentiment common to each classification of the set.

12. The system of claim 9, wherein the program instructions during execution are further adapted to perform:

recording a set of telephone calls received by the called party;

classifying each telephone call in the set; and, submitting each of the telephone calls in the set to a sentiment analysis engine in order to compute a sentiment common to each classification of the set.

13. A computer program product for telephonic fraud prevention, the computer program product comprising a computer readable storage medium having program instructions embodied therewith, wherein the computer readable storage medium is not a transitory signal per se, the program instructions executable by a device to cause the device to perform a method comprising:

speech recognizing in real-time, audio of a telephone call from a caller to a called party;

parsing text from the speech recognized audio and comparing words of the text to a hierarchical semantic tree of terms;

establishing different risk degrees for each level of a multiplicity of nodes of the hierarchical semantic tree of terms; and, on condition that a match is detected between one of the words and a word of a node of the tree, identifying a furthest depth of the tree at which the one of the words and the term of the node match, identifying a level for the furthest depth of the tree, correlating the identified level to a degree of risk of the telephone call, and displaying an alert to the called party reflecting the degree of risk.

14. The computer program product of claim 13, wherein the method further comprises:

submitting the speech recognized audio to a sentiment analysis engine to receive an indication of sentiment corresponding to the telephone call;

comparing the indication of sentiment to a pre-determined common sentiment for a classification of the telephone call; and, performing the displaying only on upon the indication of sentiment differing from the common sentiment.

15. The computer program product of claim 13, wherein the method further comprises:

submitting the speech recognized audio to a sentiment analysis engine to receive an indication of sentiment corresponding to the telephone call;

comparing the indication of sentiment to a pre-determined common sentiment for a classification of the telephone call; and, additionally displaying a confirmation of the alert upon the indication of sentiment differing from the common sentiment.

16. The computer program product of claim 13, wherein the method further comprises:

detecting a source phone number for the call and identifying a geographic location from which the telephone call originates;

determining if the geographic location is associated with a higher risk of a fraudulent telephone call; and, performing the speech recognizing, parsing, identifying and displaying in response to determining that the geographic location is associated with a higher risk of a fraudulent telephone call.

17. The computer program product of claim 14, wherein the method further comprises:

recording a set of telephone calls received by the called party;

classifying each telephone call in the set; and, submitting each of the telephone calls in the set to a sentiment analysis engine in order to compute a sentiment common to each classification of the set.

18. The computer program product of claim 15, wherein the method further comprises:

recording a set of telephone calls received by the called party;

classifying each telephone call in the set; and, submitting each of the telephone calls in the set to a sentiment analysis engine in order to compute a sentiment common to each classification of the set.

* * * * *